Feb. 17, 1925.
P. W. FLEISCHER
1,526,782
TUBULAR CONTAINER
Filed Oct. 18, 1923
2 Sheets-Sheet 1
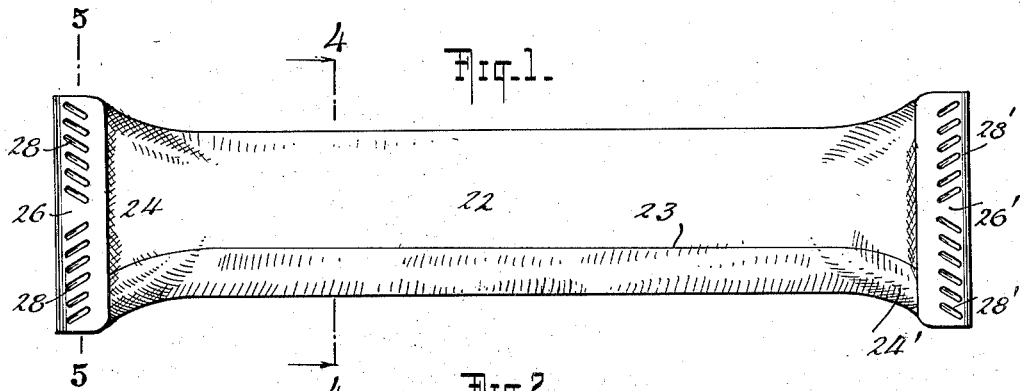
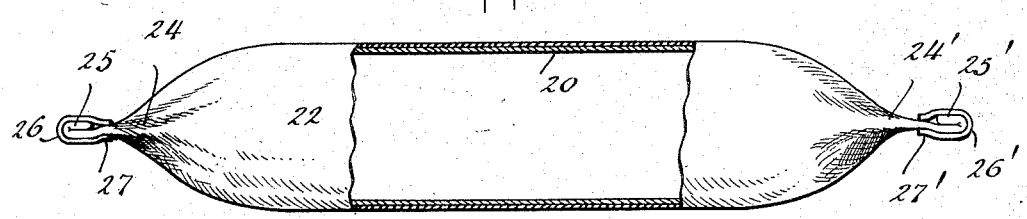
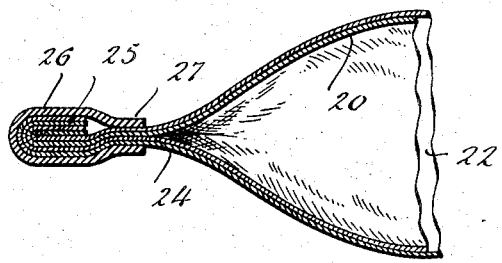
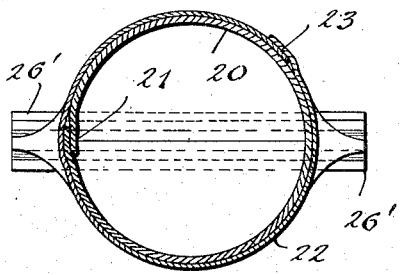
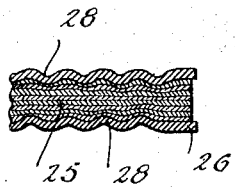
INVENTOR
PAUL W. FLEISCHER
BY
ATTORNEYS

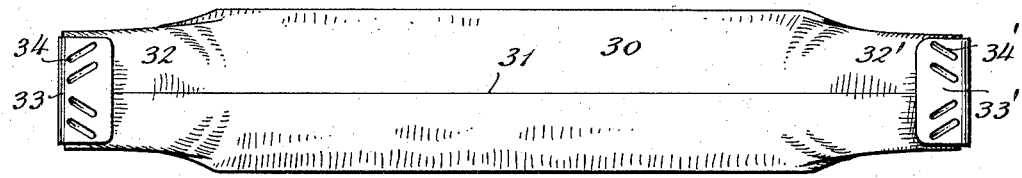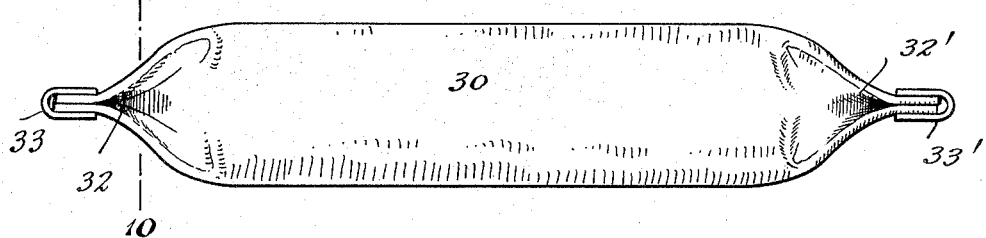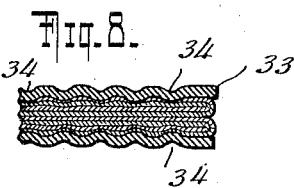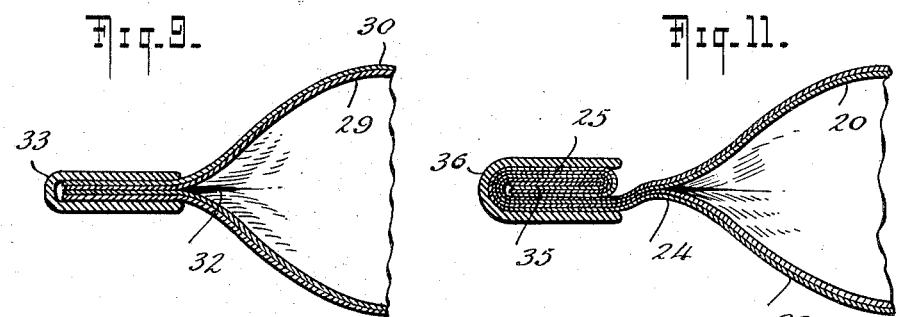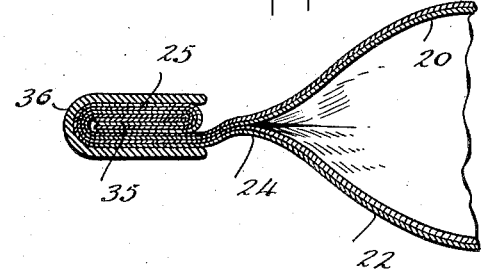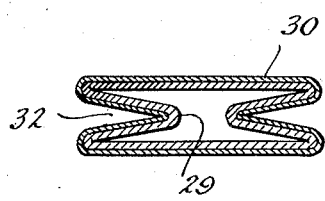

Patented Feb. 17, 1925.

1,526,782

UNITED STATES PATENT OFFICE.

PAUL W. FLEISCHER, OF WEEHAWKEN, NEW JERSEY.

TUBULAR CONTAINER.

Application filed October 18, 1923. Serial No. 669,259.

*To all whom it may concern:*

Be it known that I, PAUL W. FLEISCHER, a citizen of the United States, and resident of Weehawken, in the county of Hudson and State of New Jersey, have invented certain new and useful Improvements in Tubular Containers, of which the following is a specification.

This invention relates to tubular containers, and has been devised for the particular purpose of keeping a measured quantity of ice-cream or the like in a container which is readily filled and then closed so as to preserve such ice-cream in a sanitary condition.

Various satisfactory embodiments of the present invention are illustrated by the accompanying drawings, in which Fig. 1 is a plan view of a completed or closed container made according to my invention; Fig. 2 is a side elevation thereof, with parts in section; Fig. 3 is a partial longitudinal section, upon an enlarged scale; Figs. 4 and 5 are vertical sections, on the same scale as Fig. 3, taken on lines 4—4 and 5—5 respectively of Fig. 1; Figs. 6, 7, 8 and 9 are views corresponding to Figs. 1, 2, 5 and 3 respectively, but illustrating another form of my invention; Fig. 10 is a section on line 10—10 of Fig. 7; and Fig. 11 is a view similar to Figs. 3 and 9, showing a third form of my invention.

For the sake of clearness, the filling of ice-cream or the like has not been shown in Figs. 2, 3, 4, 9, and 11.

In the construction illustrated by Figs. 1 to 5, the container comprises an inner layer 20 of relatively stiff sanitary and waterproof paper, which may have a longitudinal joint 21 glued or otherwise secured, such layer being rolled or folded into tubular shape, with the longitudinal edges overlapping, as shown in Fig. 4. The container also has an outer layer 22, preferably of transparent waterproof paper, folded around the inner layer, with the longitudinal edges overlapped and glued or otherwise fastened together, as at 23; these edges however, should preferably not be glued to the inner layer 20, and thus the outer layer, having no connection with the inner layer except by the end clips to be described presently, will be loose relatively to such inner layer and readily detached therefrom. The purpose of making the outer layer of transparent material is to render visible therethrough, names, trade-marks, advertising matter or the like that may be provided on the outer surface of the inner layer.

The two layers having been given the tubular form referred to above, they are pinched together into a flat shape at one end as indicated at 24, and the folded or flattened end may be further folded upon itself, as indicated at 25. The flattened end is then fastened in such position in any suitable manner, as by gluing, or by means of a clip 26, preferably made of aluminum, the edges of said clip being (in this particular case) closer together than the two halves of its U-shaped body portion. The latter is provided, in its outer or exposed surfaces, with grooves 28, which form corresponding ribs on the inner surface of the body portion, said ribs being forced by the pressure of the tool producing them, into the folded end of the container. These grooves or ribs are preferably oblique with reference to the longitudinal axis of the container (see Fig. 1), and I also prefer to arrange them in two series, inclined in opposite directions; with these special arrangements, it is practically impossible to pull the clip 26 off accidentally. One end of the container having thus been closed securely, the container is filled with ice-cream or the like through the other, open end, whereupon the latter is flattened as at 24' and closed in the same manner as described above, as will be readily understood from the right-hand portions of Figs. 1 and 2, where the parts bear reference numerals similar to those at the left-hand portions. The ribs or grooves 28 of one member of the U-shaped body portion of the clip 26 may be staggered with reference to those of the other member (see Fig. 5), but other arrangements may be adopted. When the ends of the container are pinched only once before the clips 26 or 26' are applied, such ends become wider than the body of the container (see Figs. 1 and 4), and the clips employed are preferably longer than the diameter of said body.

The container having thus been filled and closed is placed within any well-known or approved refrigerating substance (say, a mixture of ice and salt), and may thus be shipped to the dealers, who will keep the containers in the refrigerating substance until they are to be delivered to their customers. The purchaser will then tear off one end of the container by means of the clip 26 or 26' at that end. Then the purchaser will strip or fold the outer layer 22 back from the end thus opened, thus exposing the inner layer 20, which has remained clean owing to the protection afforded by the waterproof outer layer 22. By pressing the other, closed end of the container, the user will force the ice-cream out gradually through the open end, thus supplying the ice-cream in a clean, sanitary condition.

In the construction illustrated by Figs. 6 to 9, the tubular container consists of an inner layer 29 and an outer layer 30 of the same character as described above, the longitudinal joint of the outer layer being indicated at 31 in Fig. 6. The return fold 25 or 25' of Figs. 2 and 3 has not been indicated in connection with this second form of my invention; on the other hand, instead of pinching each end of the container in one direction only, as at 24, 24' in Figs. 1, 2 and 3, they are pinched or folded in two directions at right angles to each other, as shown best at 32 in Fig. 10, and owing to this, the ends instead of being wider than the body portion of the container, are narrower than such body portion (Fig. 6), and in accordance therewith I employ clips 33, 33' which are shorter than the diameter of the body portion. These clips are shown as provided with grooves or ribs 34, 34' of an arrangement similar to that of the grooves or ribs 28, 28', except that (see Fig. 8) the ribs on the two members of the same clip are arranged directly opposite each other, or in registry, instead of being staggered as in Fig. 5.

The construction shown in Fig. 11 differs from those described above, by the manner of folding the end of the container. In addition to the fold 25 of Fig. 3, the container end has a return fold 35, so that the extreme edge is folded in and well protected. The clip 36 may be of substantially the same character as the clips 26, 26', 33, or 33'.

The constructions shown in Figs. 6 to 11 present same advantages as the one described with reference to Figs. 1 to 5.

Various modifications may be made without departing from the nature of my invention as set forth in the appended claims.

I claim as my invention:

1. An elongated package comprising an inner layer of sanitary material filled with edible contents and an outer layer of material surrounding the body portion of said inner layer loosely and forming an envelope therefor, the ends of both layers being sealed in conjunction with each other beyond the edible contents, the sealed portion being adapted to be removed and the outer layer adapted to be stripped back to expose the contents and end of the inner sanitary container.

2. An elongated package comprising an inner layer of sanitary material filled with edible contents, an outer layer of material surrounding the body portion of said inner layer loosely and forming an envelope therefor, and means for sealing one end of both layers in conjunction with each other beyond the edible portion, the sealing means being adapted to be detached, and the outer layer adapted to fold back to expose the contents and the end of the inner sanitary container.

3. An elongated package comprising an inner layer of sanitary material filled with an edible content, an outer layer of material surrounding said inner layer loosely and forming an envelope therefor, and clips of substantially nontearable material clamped upon and permanently closing the ends of the said layers in conjunction with each other beyond the edible content, the clips being adapted to be removed, and the outer layer being adapted to be moved to expose the content and the ends of the inner sanitary container.

4. An elongated package comprising an inner layer of readily tearable water-proof sanitary material filled with edible contents and an outer layer wrapped loosely around and unsecured to said inner layer, but forming a continuous water-proof envelope therefor, the ends of both layers being flattened and sealed in conjunction with each other beyond the edible contents, the flattened sealed ends being adapted to be removed, and the outer layer adapted to be moved relatively to the inner layer to expose the contents and the inner sanitary layer.

5. An elongated package comprising an inner layer of readily tearable sanitary material filled with an edible content, an outer layer of tearable water-proof material surrounding the inner layer loosely and unattached to the body portion thereof, and closing means of substantially non-tearable material for sealing the ends of both layers in conjunction with each other, the closing means being adapted to be removed and the outer layer moved relatively to the inner layer to expose the content and the ends of the sanitary inner layer.

6. An elongated package comprising an inner layer of sanitary material filled with edible contents, an outer layer of material surrounding the body of said inner layer and forming an envelope therefor, and clips for sealing the ends of both layers in conjunction with each other, the said clips having oppositely inclined oblique ribs pressed into the ends of the layers, the said clips being adapted to be removed, and the outer layer stripped back to expose the contents and the ends of the inner sanitary layer.

In testimony whereof I have signed this specification.

PAUL W. FLEISCHER.